United States Patent
Mark et al.

[19]

[11] Patent Number: 5,890,093
[45] Date of Patent: Mar. 30, 1999

[54] SCULLING COMPENSATION IN STRAPDOWN INERTIAL NAVIGATION SYSTEMS

[75] Inventors: John G. Mark, Pasadena; Daniel A. Tazartes, West Hills, both of Calif.

[73] Assignee: Litton Systems, Inc., Woodland Hills, Calif.

[21] Appl. No.: 742,384

[22] Filed: Nov. 1, 1996

[51] Int. Cl.[6] .................................................. G05D 1/00
[52] U.S. Cl. ............................................ 701/220; 702/94
[58] Field of Search .................................. 701/220, 221; 702/94, 95, 141, 151, 152

[56] References Cited

U.S. PATENT DOCUMENTS

| | | | |
|---|---|---|---|
| 4,601,206 | 7/1986 | Watson | 73/514 |
| 4,675,820 | 6/1987 | Smith et al. | 364/453 |
| 4,812,977 | 3/1989 | Hulsing, II | 364/422 |
| 4,914,598 | 4/1990 | Krogmann et al. | 364/434 |
| 5,146,417 | 9/1992 | Watson | 364/571.01 |
| 5,410,487 | 4/1995 | Okayama et al. | 364/453 |
| 5,422,817 | 6/1995 | Tazartes et al. | 364/571.01 |
| 5,719,772 | 2/1998 | Benes | 364/453 |

OTHER PUBLICATIONS

P.G. Savage; *Strapdown System Algorithms*; Advances in Strapdown Inertial Systems ( AGARD–LS–133); Neuilly Sur Seine, France: AGARD, 1984; p. 3/1–30 of v+224 pp.

*Primary Examiner*—Michael Zanelli
*Attorney, Agent, or Firm*—Robert E. Malm

[57] ABSTRACT

The invention is a method and apparatus for compensating for sculling in a strapdown inertial navigation system. The method operates on a sequence of inputs $\Delta V_B(n)$ derived at times $n\Delta t$ from the outputs of one or more accelerometers. Separately compensated quantities $\Delta V_{Bc}(m,p)$ calculated at times $(pJ+\tfrac{1}{2})\Delta t$ for M values of m are obtained by summing $A(m,k)\Delta V_B(pJ-j-k)$ over k from 0 to K−1 and over j from 0 to J−1 where the constants $A(m,k)$ are chosen to minimize sculling error in the individual $\Delta V_{Nc}(m,p)$ quantities where $\Delta V_{Nc}(m,p)$ is the representation of $\Delta V_{Bc}(m,p)$ in the navigation frame of reference. The final compensated quantity $\Delta V_{Bc}(p)$ is obtained by summing $B(m)\Delta V_{Bc}(m,p)$ over m where the constants $B(m)$ are chosen to minimize sculling error in $\Delta V_{Nc}(p)$ where $\Delta V_{Nc}(p)$ is the representation of $\Delta V_{Bc}(p)$ in the navigation frame of reference.

34 Claims, 3 Drawing Sheets

SCULLING COMPENSATION IN STRAPDOWN INERTIAL NAVIGATION SYSTEMS

BACKGROUND OF THE INVENTION

Strapdown inertial navigation systems are frequently used in missiles and aircraft. Physically isolated and stabilized apparatus, such as a gimballed platform that is physically angularly-stabilized relative to the local vertical direction, require precise and mechanically complex angle positioning apparatus, and are being systematically replaced by systems of the strapdown type.

A state-of-the-art strapdown inertial navigation system has three rotation sensors or gyros and three accelerometers rigidly attached to a supporting vehicle. The rotation sensors are each positioned and oriented to sense angular displacement about one of three defined orthogonal axes attached to the vehicle body and known as the body coordinate system. The accelerometers are each positioned and oriented in a fixed direction relative to the vehicle, to sense velocity changes (incremental velocities) along different ones of the three defined orthogonal axes. In a strapdown system, the accelerometer axes are not angularly stabilized.

Because the accelerometers are constantly changing direction relative to gravity, navigation velocities cannot be computed by directly integrating the accelerometer signals. Instead, a stable computational frame or analytic navigation coordinate system is continually generated. The output signals from the rotation sensors are used by an attitude integration apparatus to calculate the directions of local vertical, together with two other axes orthogonal to the local vertical direction.

Sensed angle changes and accelerations (incremental velocities) are continually rotated through the calculated angles from the vehicle body axes to the calculated navigation axes. Angle signals from the rotation sensors are used to update the computer-stored angular position and incremental velocity data for both the angle sensors and accelerometers relative to the navigation coordinate system.

The rotation sensors and accelerometers have fixed relative directions in the body coordinate system. An angular transformation matrix of direction cosines is computed in an attitude integration apparatus. The accelerometer signals, which are incremental changes in velocity, in the strapdown body coordinate system are converted in a coordinate transformation computer from that system into corresponding signals in the stabilized navigation coordinate system.

After transformation into the navigation coordinate system, the incremental velocity signals are integrated or summed to form updated velocity signals. The rotation sensor and accelerometer signals are sampled, and the sampled signals are delivered to a computer which is programmed to accept the signals and to calculate both velocities along the three axes in the stabilized navigation coordinate system and attitude angles relative to this system.

A rotation matrix is created in the attitude integration apparatus to transform vector body-coordinate signals (for example, incremental velocity component signals) from the body coordinate system of the instruments to the navigation coordinate system. The transformed signals are used to calculate and create signals that are measures of the local geographical position of the aircraft and the direction of the local gravity. The transformation matrix also yields signals that are measures of the angular orientation of the supporting vehicle relative to the navigation coordinate system.

The data used to compute the transformation matrix is sampled at finite periodic intervals, causing the bandwidth of the signals to be limited. When the instruments sense vibrations that occur at frequencies above or near the upper limit of the bandwidth of the transformation, where the response is poor, rectification errors occur in the calculated incremental velocity signals, and the navigation coordinate system signals are degraded. The rectification errors producing such degrading are called sculling errors.

A sculling error for a first strapped down axis is caused by a periodic angular displacement about a second axis perpendicular to that axis, multiplied by the periodic acceleration along a third axis perpendicular to the first and second axes.

To reduce the sculling error in strapdown systems, the sampling rate of the instrument signals can be increased. The upper limit of the sampling rate is set by the capabilities of the computer. An increase in sampling rate in a fast computer would likely increase the number of its calculations. The faster the computer, the greater its initial cost. The larger number of calculations might also require a prohibitively sophisticated computer with large power demand.

Instead of increasing the iteration rate for the transformation of incremental velocity from one coordinate system to the other, one might use a sculling compensation algorithm which has the effect of reducing sculling errors while only moderately increasing the computational requirements.

One could use both a faster sampling and sculling compensation to improve further the transformation of incremental velocity from body coordinates to navigation coordinates.

SUMMARY OF THE INVENTION

The invention is a method and apparatus for compensating for sculling in a strapdown inertial navigation system. A sequence of inputs $\Delta V_B(n)$ derived at times $n\Delta t$ from the outputs of one or more accelerometers is compensated for sculling using the equation $$\Delta V_{Bc}(m,p) = \sum_{j=0}^{J-1} \sum_{k=0}^{K-1} A(m,k) \Delta V_B(pJ-j-k)$$

The quantities $A(m,k)$ are constants chosen to minimize the sculling error in the compensated outputs $\Delta V_{Nc}(m,p)$ where $\Delta V_{Nc}(m,p)$ is the representation of $\Delta V_{Bc}(m,p)$ in the navigation frame of reference. The compensated outputs are obtained at times $pJ\Delta t$ where p is an integer and J is an integer greater than one. Further compensation is achieved through the use of the equation $$\Delta V_{Bc}(p) = \sum_{m=1}^{M} B(m) \Delta V_{Bc}(m,p)$$

which combines the weighted compensated outputs $\Delta V_{Bc}(m,p)$ to obtain a final compensated output $\Delta V_{Bc}(p)$. The weights $B(m)$ are chosen to minimize the sculling error in $\Delta V_{Nc}(p)$ where $\Delta V_{Nc}(p)$ is the representation of $\Delta V_{Bc}(p)$ in the navigation frame of reference.

DESCRIPTION OF THE PREFERRED EMBODIMENTS

Figure 1:
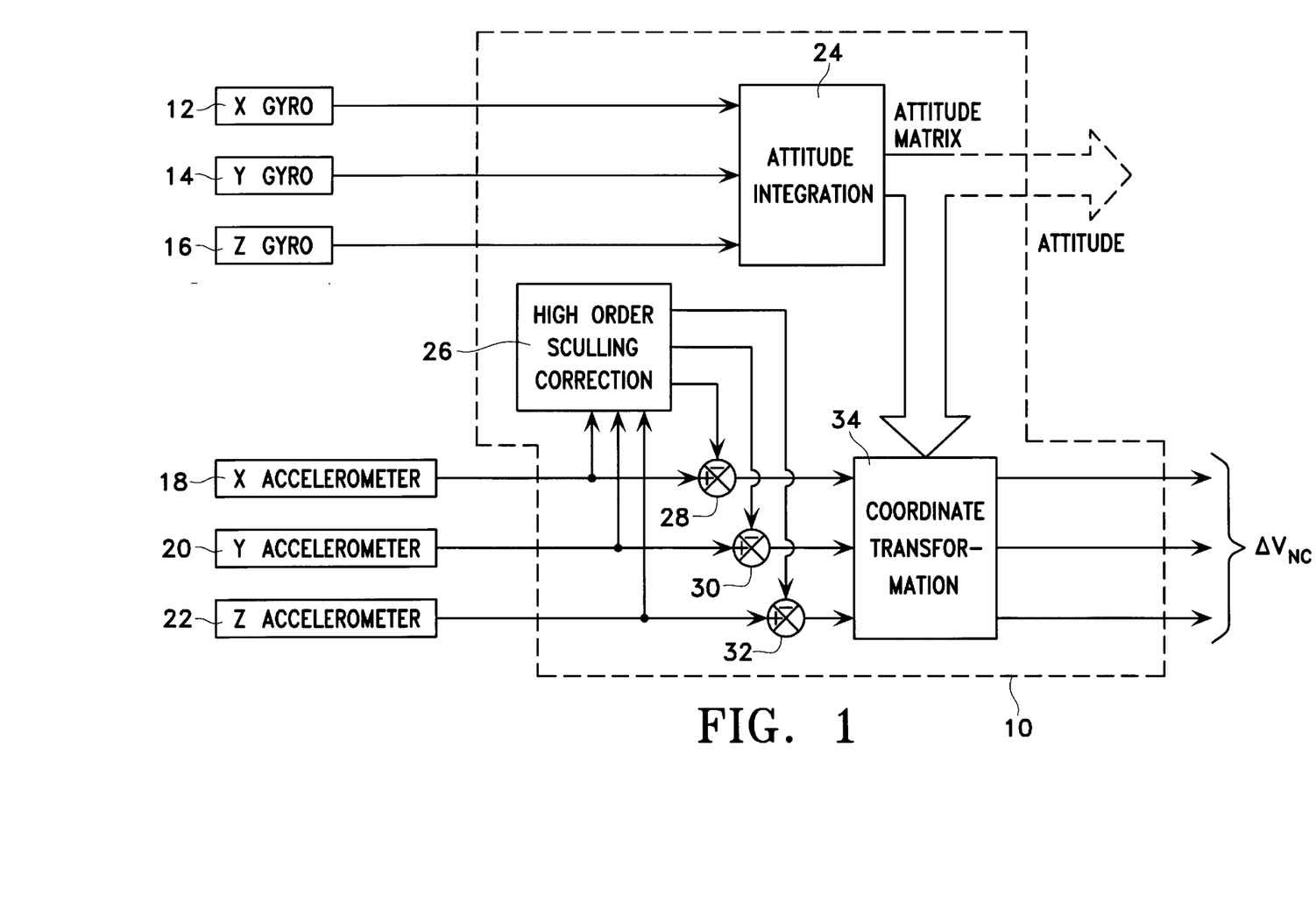
FIG. 1 is a block diagram of the program that controls the operations of a digital processor in a strapdown inertial navigation system showing the direct entry of the outputs from the sculling-compensation program segment into the coordinate-transformation program segment.

A navigation solution is obtained in a strapdown inertial navigation system by a digital processor in accordance with instructions listed in a program stored in memory. The program 10 comprises a number of program segments, some of which are shown in FIG. 1. Angle-of-rotation inputs for the navigation solution are provided by x-gyro 12, y-gyro 14, and z-gyro 16 which measure angles of rotation about the $x_B$, $y_B$, and $z_B$ axes in a body coordinate system fixed in the vehicle which carries the navigation system. Acceleration inputs are provided by x-accelerometer 18, y-accelerometer 20, and z-accelerometer 22.

The changes in angles measured by the gyros during a sampling interval $\Delta t$ are supplied to the digital processor at the end of each interval $\Delta t$, and the program segment 24 causes the matrix representing the attitude of the body coordinate system to the navigation coordinate system with coordinates $x_N$, $y_N$, and $z_N$ to be updated.

The accelerometer outputs, which represent the change in velocity $\Delta V_B$ of the body expressed with respect to the $x_B$, $y_B$, and $z_B$ coordinates in the body coordinate system during an interval $\Delta t$, are utilized in program segment 26 together with arithmetic operations 28, 30, and 32 to obtain the sculling-compensated change in velocity $\Delta V_{Bc}$. The sculling correction is subtracted from the input $\Delta V_B$ as a result of arithmetic operations 28, 30, and 32, and the sculling-compensated change in velocity $\Delta V_{Bc}$ is transformed to the sculling-compensated change in velocity $\Delta V_{Nc}$ expressed in navigation coordinates by program segment 34.

Figure 2:
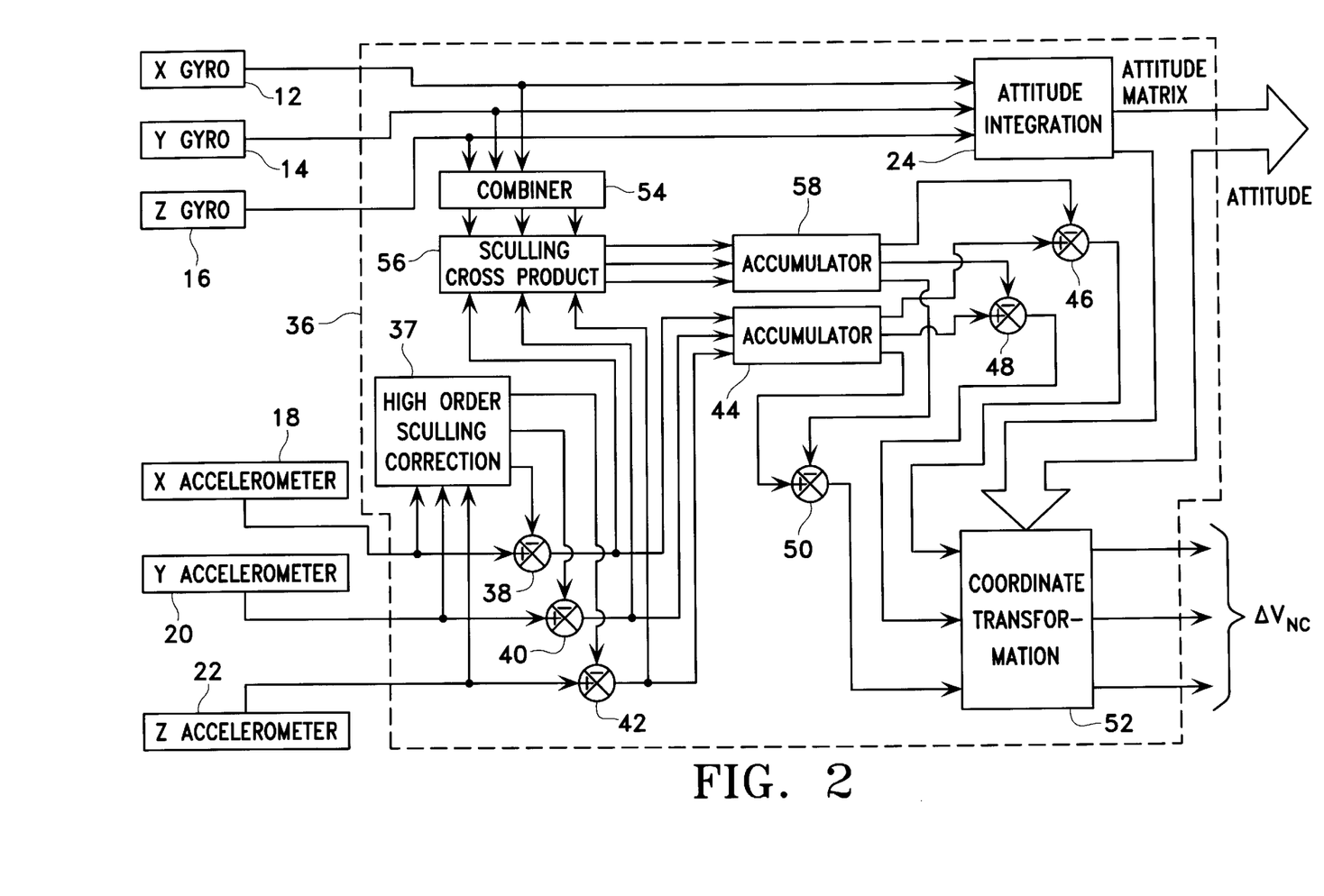
FIG. 2 is a block diagram of the program that controls the operations of a digital processor in a strapdown inertial navigation system showing additional sculling-compensation operations performed on the outputs from the sculling-compensation program segment before entering the coordinate-transformation program segment.

The data processing activities indicated in FIG. 1 are based on the assumption that coordinate transformation occurs at the same $\Delta t$ interval that the sampling of the gyros and accelerometers occurs. A more general approach to performing the data processing activities is shown in FIG. 2 which is based on the assumption that coordinate transformations occur at intervals $T\Delta t$ where T is an integer. The program 36, under this assumption, still includes a sculling-compensation program segment 37 together with arithmetic operations 38, 40, and 42 which transform $\Delta V_B$ into $\Delta V_{Bc}$. In addition, accumulator program segment 44 causes T successive $\Delta V_{Bc}$ values to be summed, the result being $\Delta V_{BcT}$. If the subtrahends used in the arithmetic operations 48 and 50 are zero, program segment 52 transforms each $\Delta V_{BcT}$ into $\Delta V_{Nc}$ at $T\Delta t$ intervals.

Another approach to obtaining the $\Delta V_{Bc}$ values is to include velocity-angular velocity cross products by means of program segments 54, 56, and 58. The outputs of the gyros 12, 14, and 16 at time $t\Delta t$ after the beginning of a $T\Delta t$ interval approximate a vector angle $\Delta\theta(t)$ where t takes on integer values between 1 and T. The combiner program segment 54 causes the approximate vector angle $\phi(t)$ to be generated for each value of t where $$\phi(t) = \sum_{u=1}^{t} \theta(u) \tag{1}$$

The sculling-cross product program segment 56 causes $\Delta V_{Bc}(t) \times \phi(t)$ to be computed, and the accumulator program segment 58 causes this quantity to be summed for $T\Delta t$ intervals. Minuends from accumulator program segment 44 are combined with subtrahends from accumulator program segment 58 as a result of arithmetic operations 46, 48, and 50, the result being values of $\Delta V_{BcT}$ which are transformed by means of program segment 52 into $\Delta V_N$ at $T\Delta t$ intervals.

The publication "Strapdown System Algorithms" by P. G. Savage, AGARD Lecture Series No. 133 (May 1984) provides a detailed description and analysis of the cross-product compensation method. A patent by Tazartes and Mark (U.S. Pat. No. 5,422,817, issued Jun. 6, 1995) is incorporated by reference and provides additional details concerning the above subject matter.

While sculling is strictly a three-dimensional problem, it can be represented by two-dimensional matrices. The direction cosine matrix from body to navigation frame $C_B^N$ is given by $$C_B^N = \begin{bmatrix} \cos(\theta\sin\omega t) & -\sin(\theta\sin\omega t) \\ \sin(\theta\sin\omega t) & \cos(\theta\sin\omega t) \end{bmatrix} \tag{2}$$

where $\theta$ is the amplitude of the angular motion, $\omega$ is the angular frequency of the motion, and t is time. The inphase and quadrature acceleration vectors are given by $$A_{Ni} = a \begin{bmatrix} \sin\omega t \\ 0 \end{bmatrix} \quad A_{Nq} = a \begin{bmatrix} \cos\omega t \\ 0 \end{bmatrix} \tag{3}$$

where $\alpha$ is the amplitude of the linear acceleration.

The body frame acceleration $A_B$ is expressed in terms of the navigation frame acceleration $A_N$ by $$A_B = (C_B^N)^T A_N \tag{4}$$

For quadrature acceleration, the body frame acceleration is given by $$A_B = \alpha \begin{bmatrix} \cos(\theta\sin\omega t)\cos\omega t \\ -\sin(\theta\sin\omega t)\cos\omega t \end{bmatrix} \tag{5}$$

which in the small angle case simplifies to $$A_B = a \begin{bmatrix} \cos\omega t \\ -\dfrac{\theta}{2} \sin 2\omega t \end{bmatrix} \tag{6}$$

The accelerometers measure integrated acceleration $\Delta V_B$ (i.e. change in velocity) over a sampling interval $\Delta t$. Thus, $$\Delta V_B = \int_{(n-1)\Delta t}^{n\Delta t} A_B(t) dt \cong \tag{7}$$

$$\dfrac{a}{\omega} \begin{bmatrix} \sin(n\omega\Delta t) - \sin[(n-1)\omega\Delta t] \\ \dfrac{\theta}{4} \{\cos(2n\omega\Delta t) - \cos[2(n-1)\omega\Delta t]\} \end{bmatrix}$$

and $$\dfrac{\Delta V_B}{\Delta t} \cong a \begin{bmatrix} \dfrac{\sin\left(\dfrac{1}{2}\omega\Delta t\right)}{\dfrac{1}{2}\omega\Delta t} \cos\left[\left(n-\dfrac{1}{2}\right)\omega\Delta t\right] \\ -\dfrac{\theta}{2} \left[\dfrac{\sin\omega\Delta t}{\omega\Delta t} \sin[(2n-1)\omega\Delta t]\right] \end{bmatrix} \tag{8}$$

Transformation to the navigation frame using the small angle approximation leads to the equation $$\frac{\Delta V_N}{\Delta t} = C_B{}^N \frac{\Delta V_B}{\Delta t} \simeq a \begin{bmatrix} \frac{\sin\left(\frac{1}{2}\omega\Delta t\right)}{\frac{1}{2}\omega\Delta t} \cos\left[\left(n-\frac{1}{2}\right)\omega\Delta t\right] \\ -\frac{\theta}{2}\left[\frac{\sin(\omega\Delta t)}{\omega\Delta t}\sin[(2n-1)\omega\Delta t]\right] + \theta\left[\frac{\sin\left(\frac{1}{2}\omega\Delta t\right)}{\frac{1}{2}\omega\Delta t}\sin(n\omega\Delta t)\cos\left[\left(n-\frac{1}{2}\right)\omega\Delta t\right]\right] \end{bmatrix} \quad (9)$$

The last term of the second vector component rectifies resulting in an average value ($\Delta V_N/\Delta t$) given by $$\left(\frac{\Delta V_N}{\Delta t}\right) \simeq \frac{a\theta}{2}\begin{bmatrix} 0 \\ \frac{\sin\left(\frac{1}{2}\omega\Delta t\right)}{\frac{1}{2}\omega\Delta t}\sin\left(\frac{1}{2}\omega\Delta t\right) \end{bmatrix} \simeq \frac{a\theta}{2}\begin{bmatrix} 0 \\ \frac{1}{2}(\omega\Delta t) \end{bmatrix} \quad (10)$$

Since there is no average value in the body frame, this error is due to the fact that $\Delta V$ lags the direction cosine matrix by $\Delta t/2$. Traditionally, this lag is compensated using a vector cross product of the form $\frac{1}{2}\Delta\theta \times \Delta V$ (see Savage paper). This compensation completely eliminates the quadrature sculling error.

For inphase acceleration, the body frame acceleration is given by $$A_B = a\begin{bmatrix} \cos(\theta\sin\omega t)\sin\omega t \\ -\sin(\theta\sin\omega t)\sin\omega t \end{bmatrix} \quad (11)$$

which in the small angle case simplifies to $$A_B \simeq a\begin{bmatrix} \sin\omega t \\ -\theta\sin^2\omega t \end{bmatrix} \quad (12)$$

The accelerometers measure integrated acceleration $\Delta V_B$ (i.e. change in velocity) over a sampling interval $\Delta t$. Thus, $$\Delta V_B = \int_{(n-1)\Delta t}^{n\Delta t} A_B(t)dt \simeq a\begin{bmatrix} \frac{-\cos(n\omega\Delta t)}{\omega} + \frac{\cos[(n-1)\omega\Delta t]}{\omega} \\ \frac{\theta}{2}\left[\frac{\sin(2n\omega\Delta t)}{2\omega} - \frac{\sin[2(n-1)\omega\Delta t]}{2\omega} - \Delta t\right] \end{bmatrix} \quad (13)$$

and $$\frac{\Delta V_B}{\Delta t} \simeq a\begin{bmatrix} \frac{\sin\left(\frac{1}{2}\omega\Delta t\right)}{\frac{1}{2}\omega\Delta t}\sin\left[\left(n-\frac{1}{2}\right)\omega\Delta t\right] \\ \frac{\theta}{2}\left[\frac{\sin\omega\Delta t}{\omega\Delta t}\cos[(2n-1)\omega\Delta t] - 1\right] \end{bmatrix} \quad (14)$$

Transformation to the navigation frame using the small angle approximation leads to the equation $$\frac{\Delta V_N}{\Delta t} \simeq a\begin{bmatrix} \frac{\sin\left(\frac{1}{2}\omega\Delta t\right)}{\frac{1}{2}\omega\Delta t}\sin\left[\left(n-\frac{1}{2}\right)\omega\Delta t\right] \\ \frac{\theta}{2}\left[\frac{\sin(\omega\Delta t)}{\omega\Delta t}\cos[(2n-1)\omega\Delta t] - 1\right] + \theta\left[\frac{\sin\left(\frac{1}{2}\omega\Delta t\right)}{\frac{1}{2}\omega\Delta t}\sin(n\omega\Delta t)\sin\left[\left(n-\frac{1}{2}\right)\omega\Delta t\right]\right] \end{bmatrix} \quad (15)$$

Only the last term rectifies resulting in an average value ($\Delta V_N/\Delta t$) given by $$\left(\frac{\Delta V_N}{\Delta t}\right) \simeq \frac{a\theta}{2}\begin{bmatrix} 0 \\ \frac{\sin(\omega\Delta t)}{\omega\Delta t} - 1 \end{bmatrix} \simeq -\frac{a\theta}{2}\begin{bmatrix} 0 \\ \frac{1}{6}(\omega\Delta t)^2 \end{bmatrix} \quad (16)$$

The inphase sculling error results from imperfect cancellation of the DC term present in the body frame data. The use of the compensation algorithm described in the Savage paper does not modify this error.

Inphase sculling errors can be reduced and quadrature sculling eliminated without the use of a compensation algorithm by avoiding the inherent lag between the $\Delta V$s and the direction cosine matrix. This is accomplished by relocating the $\Delta V$ sampling interval to span $(n-\frac{1}{2})\Delta t$ to $(n+\frac{1}{2})\Delta t$ instead of $(n-1)\Delta t$ to $n\Delta t$ and transforming with the direction cosine matrix in the center of the interval (i.e. at $n\Delta t$). That is:

$$\Delta V_B = \int_{(n-1/2)\Delta t}^{(n+1/2)\Delta t} A_B(t)dt \quad (17)$$

For the in-phase case $$\Delta V_B \simeq \quad (18)$$

$$a\left[\begin{array}{c}\dfrac{-\cos[(n+1/2)\omega\Delta t]}{\omega}+\dfrac{\cos[(n-1/2)\omega\Delta t]}{\omega}\\ \dfrac{\theta}{2}\left[\dfrac{\sin[(2n+1)\omega\Delta t]}{2\omega}-\dfrac{\sin[(2n-1)\omega\Delta t]}{2\omega}-\Delta t\right]\end{array}\right]$$

and $$\dfrac{\Delta V_B}{\Delta t}\approx a\left[\begin{array}{c}\dfrac{\sin\left(\dfrac{1}{2}\omega\Delta t\right)}{\dfrac{1}{2}\omega\Delta t}\sin(n\omega\Delta t)\\ \dfrac{\theta}{2}\left[\dfrac{\sin\omega\Delta t}{\omega\Delta t}\cos(2n\omega\Delta t)-1\right]\end{array}\right] \quad (19)$$

The transformation to navigational coordinates results in $$\dfrac{\Delta V_N}{\Delta t}\approx a\left[\begin{array}{c}\dfrac{\sin\left(\dfrac{1}{2}\omega\Delta t\right)}{\dfrac{1}{2}\omega\Delta t}\sin(n\omega\Delta t)\\ \dfrac{\theta}{2}\left[\dfrac{\sin(\omega\Delta t)}{\omega\Delta t}\cos(2n\omega\Delta t)-1\right]+\theta\left[\dfrac{\sin\left(\dfrac{1}{2}\omega\Delta t\right)}{\dfrac{1}{2}\omega\Delta t}\sin^2(n\omega\Delta t)\right]\end{array}\right] \quad (20)$$

As before, only the second vector component contains a DC part. The average sculling error is given by $$\left(\dfrac{\Delta V_N}{\Delta t}\right)\approx\dfrac{a\theta}{2}\left[\begin{array}{c}0\\ \dfrac{\sin\left(\dfrac{1}{2}\omega\Delta t\right)}{\dfrac{1}{2}\omega\Delta t}-1\end{array}\right]\approx -\dfrac{a\theta}{2}\left[\begin{array}{c}0\\ \dfrac{1}{24}(\omega\Delta t)^2\end{array}\right] \quad (21)$$

The error equation for the properly centered algorithm has exactly the same form as that of the conventional algorithm but with double the bandwidth. The centered approach generates no quadrature sculling error even in a large angle condition (i.e. exact solution) thus eliminating the need for the cross-product compensation. Clearly, the centered algorithm is advantageous since it exhibits reduced error and requires less computation.

The analytic form of the inphase sculling response shows that the net error results from attenuation of high frequencies in the measured body frame $\Delta Vs$. Compensation for this attenuation can be easily accomplished by artificially boosting the high frequency response of the $\Delta Vs$ using the following filtering techniques.

In the frequency domain $$\Delta V_{Bc}=F_\omega(\omega)\Delta V_B \quad (22)$$

and in the sampled data domain $$\Delta V_{Bc}=F_z(Z)\Delta V_B \quad (23)$$

The symbol $\Delta V_{Bc}$ denotes the values of $\Delta V_B$ compensated for sculling. The symbol $F_\omega(\omega)$ denotes the frequency characteristic of the filter. The filter expressed in terms of Z, the Z-transform operator, is denoted by $F_z(Z)$.

For example, an algorithm disclosed in the Tazartes/Mark patent is given by $$\Delta V_{Bct/m}(n)=\Delta V_B(n)-\dfrac{1}{24}[\Delta V_B(n+1)-2\Delta V_B(n)+\Delta V_B(n-1)] \quad (24)$$

where t/m denotes "Tazartes/Mark" and $$\Delta V_B(n)=\int_{(n-1/2)\Delta t}^{(n+1/2)\Delta t}A_B(t)dt \quad (25)$$

The Tazartes/Mark algorithm $F_{zt/m}(Z)$, expressed in terms of the Z-transform operator, is given by $$F_{Zt/m}(Z)=1-\dfrac{1}{24}(Z-2+Z^{-1}) \quad (26)$$

and the corresponding frequency characteristic $F_{\omega t/m}(\omega)$ is given by $$F_{\omega t/m}(\omega)=1+\dfrac{1}{6}\sin^2\left(\dfrac{1}{2}\omega\Delta t\right) \quad (27)$$

The sculling-compensated change in velocity $\Delta V_{Bc}(n)$ of the body frame of reference is transformed through the direction cosine matrix at time $n\Delta t$ to the sculling-compensated change in velocity $\Delta V_{Nc}(n)$ in the navigation frame. It can be shown that $$\dfrac{\Delta V_{Bc}}{\Delta t}\approx a\left[\begin{array}{c}\dfrac{\sin\left(\dfrac{1}{2}\omega\Delta t\right)}{\dfrac{1}{2}\omega\Delta t}F_\omega(\omega)\sin(n\omega\Delta t)\\ \dfrac{\theta}{2}\left[\dfrac{\sin\omega\Delta t}{\omega\Delta t}F_\omega(2\omega)\cos(2n\omega\Delta t)-1\right]\end{array}\right] \quad (28)$$

When the compensated $\Delta V_{Bc}$ is transformed to the navigation frame, the following average error results for inphase sculling:

$$\left(\dfrac{\Delta V_{Nc}}{\Delta t}\right)\approx\dfrac{a\theta}{2}\left[\begin{array}{c}0\\ \dfrac{\sin\left(\dfrac{1}{2}\omega\Delta t\right)}{\dfrac{1}{2}\omega\Delta t}F_\omega(\omega)-1\end{array}\right] \quad (29)$$

which for the sculling correction given in equation (27) yields approximately $$\left(\dfrac{\Delta V_{Nc}}{\Delta t}\right)\approx -\dfrac{a\theta}{2}\left[\begin{array}{c}0\\ \dfrac{3}{640}(\omega\Delta t)^4\end{array}\right] \quad (30)$$

where $\Delta V_{Nc}(n)$ is the sculling-compensated change in velocity in the navigational frame of reference.

Figure 3:
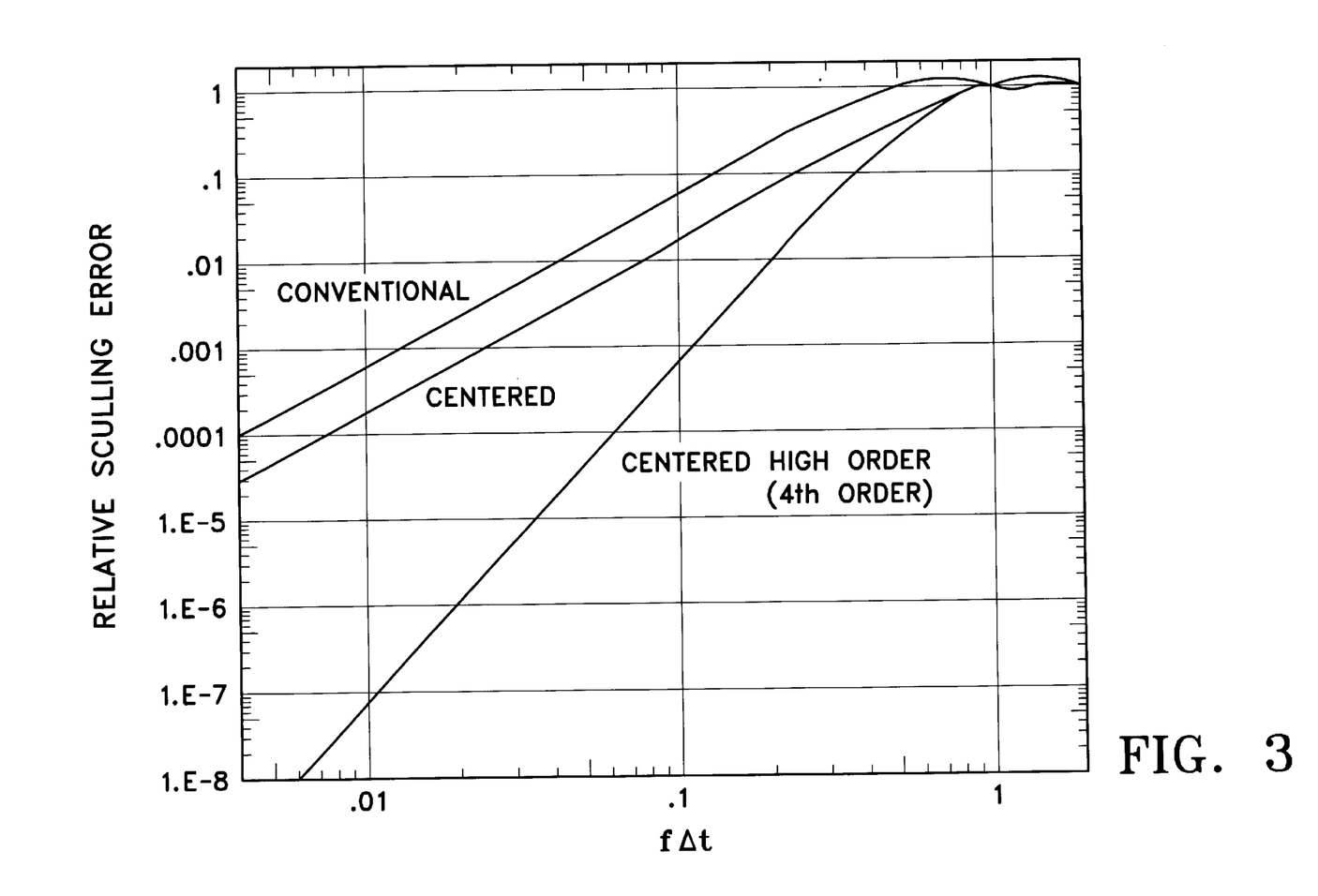
FIG. 3 is a plot of the normalized sculling error response for conventional and centered algorithms.

In the above error equation, the second-order terms in $(\omega\Delta t)$ cancel, leaving only terms of fourth order and above. A plot of the normalized sculling error response is given in FIG. 3 for both the conventional and centered algorithms as well as for the high order algorithm disclosed in the Tazartes/Mark patent and described by equations (24), (26), and (27).

While the above analysis was done for the small angle case, an exact treatment yields results which very closely match the above error equations at high and low frequencies in realistic situations. The exact solution is given by $$\left(\frac{\Delta V_{Nc}}{\Delta t}\right) = 2a\left[\sum_{k=1}^{\infty} J_k(\theta)J_k'(\theta)\left[\frac{\sin\left(\frac{k}{2}\omega\Delta t\right)}{\frac{k}{2}\omega\Delta t}F_\omega(k\omega) - 1\right]\right] \quad (31)$$

where $J_k$ is the Bessel function of order k and $J'_k$ is its derivative.

The Tazartes/Mark patent describes methods of achieving arbitrarily high-order sculling response by repetitively using the $F_z(Z)$ given above. This approach, however, results in longer data delays as more and more data samples are required to form the compensation terms. The present invention is a method and apparatus for extending the order by employing shorter sampling intervals to construct $F_z(Z)$, thus yielding higher order response without introducing extensive delays.

This invention utilizes the equations $$\Delta V_{Bc}(m,p) = \sum_{j=0}^{J-1}\sum_{k=0}^{K-1} A(m,k)\Delta V_B(pJ-j-k) \quad (32)$$

$$\Delta V_{Bc}(p) = \sum_{m=1}^{M} B(m)\Delta V_{Bc}(m,p) \quad (33)$$

where K is the number of values of $\Delta V_B(n)$ used in obtaining each value of $\Delta V_{Bc}(p)$, J is the number of instrument sampling intervals separating each coordinate transformation, and M is the number of filters involved in obtaining $\Delta V_{Bc}(p)$. The integer p identifies the coordinate transformations. The quantities A (m,k) and B(m) are constants.

New values for $\Delta V_{Bc}(p)$ are obtained at times pJΔt. These values for $\Delta V_{Bc}(p)$ are transformed into values of $\Delta V_{Nc}(p)$ using the coordinate transformation matrix $C_b^N[pJ-(J+K-1)/2]$:

$$\Delta V_{Nc}(p) = C_B^N\left(pJ - \frac{J+K-2}{2}\right)\Delta V_{Bc}(p) \quad (33)$$

The function $F_z(j,K,Z)$ is defined by the equation $$F_Z(j,K,Z) = \sum_{k=0}^{K-1} A(m,k)Z^{-(j+k)} \quad (34)$$

An example of fourth-order sculling compensation (i.e. residual inphase sculling error involving powers of ωΔt of four or more) with K=5, J=2, and M=1 is: A(1,0)=-1/24, A(1,1)=0, A(1,2)=13/12, A(1,3)=0, A(1,4)=1/24, and B(1)=1.

A second example of fourth-order sculling compensation with K=3, J=2, and M=1 is: A(1,0)=-1/6, A(1,1)=4/3, A(1,2)=-1/6 and B(1)=1. This can also be expanded into the K=5, J=2, M=1 configuration with the addition of two "dummy" null coefficients: A(1,0)=0, A(1,1)=-1/6, A(1,2)=4/3, A(1,3)=-1/6, A(1,4)=0, and B(1)=1.

The filters in the first and the second examples can be combined to obtain sixth-order sculling compensation for K=5, J=2, and M=2: A(1,0)=-1/24, A(1,1)=0, A(1,2)=13/12, A(1,3)=0, A(1,4)=-1/24, A(2,0)=0, A(2,1)=-1/6, A(2,2)=4/3, A(2,3)=-1/6, A(2,4)=0, B(1)=-4/5, and B(2)=9/5.

Alternatively, an equivalent single filter with K=5, J=2, and M=1 is given by: A(1,0)=1/30, A(1,1)=-3/10, A(1,2)=38/15, A(1,3)=-3/10, A(1,4)=1/30, and B(1)=1.

A third example of fourth-order sculling compensation K=5, J=4, and M=1 is: A(1,0)=-1/6, A(1,1)=0, A(1,2)=4/3, A(1,3)=0, A(1,4)=-1/6, and B(1)=1.

A fourth example of fourth-order sculling compensation with the same parameter values is: A(1,0)=0, A(1,1)=-2/3, A(1,2)=7/3, A(1,3)=-2/3, A(1,4)=0, and B(1)=1. For reduced delay, this fourth example could be configured using K=3, J=4, and M=1: A(1,0)=-2/3, A(1,1)=7/3, A(1,2)=-2/3, and B(1)=1.

The third and fourth examples using different filters can also be combined to obtain sixth-order sculling compensation for K=5, J=4, and M=2: A(1,0)=-1/6, A(1,1)=0, A(1,2)=4/3, A(1,3)=0, A(1,4)=-1/6, A(2,0)=0, A(2,1)=-2/3, A(2,2)=7/3, A(2,3)=-2/3, A(2,4)=0, B(1)=11/5, and B(2)=16/5.

It is also possible to further combine filter functions (i.e. use values of M greater than 2) to cancel out additional terms. That is, the fourth-order term, sixth-order term, and even higher-order terms can be cancelled out. While the above examples involve an attitude matrix $C_B^N$ to transform coordinates at every JΔt, it is also possible to perform first-order cross product transformations $\phi \times \Delta V_{Bc}$ or $\Delta V_{Bc} \times \phi$ where $\phi$ is the appropriate summation of the Δθs from the gyro outputs as discussed in the Tazartes/Mark patent. The actual attitude transformation matrix is then applied at a lower rate. While this approach may save some computer throughput, it is generally no longer required with modem computers.

The filter constants A(m,k) in the above examples are chosen so that after transformation to the navigation coordinates, the second-order errors in ωΔt exactly cancel leaving only fourth- and higher-order sculling errors. Although the use of the exact filter constants given above is recommended in order to achieve perfect cancellation of the second-order errors, the technique described above is still advantageous if the constants are for some reason specified imprecisely. For example, if the constants were so specified as to permit only 90% cancellation of the second-order errors, one would still realize a factor often reduction in the second-order errors. Similarly, if the specification of the constants B(m) resulted in only 90% cancellation of the fourth-order errors, one would still realize a factor of ten reduction in the fourth-order errors.

Another way of expressing this idea is as follows. Assume that a certain set of specified filter constants provides complete cancellation of the qth and all lower order sculling error terms. The invention described herein would still be useful if the filter constants were approximations of the specified constants to the extent that the inphase sculling error was approximately proportional to $(\omega\Delta t)^{(q+2)}$ for values of ωΔt in some range of values less than 1.

What is claimed is:

1. A method for compensating for sculling in a strapdown inertial navigation system, a sequence of inputs $\Delta V_B(n)$ being derived at times nΔt from the outputs of one or more accelerometers, n being an integer and Δt being a time interval, the inputs $\Delta V_B(n)$ being compensated for sculling, the compensated outputs being obtained at times (pJ+½)Δt and being denoted by $\Delta V_{Bc}(m,p)$, the method comprising the steps:

selecting values for the set A (m,k) in the equation $$\Delta V_{Bc}(m,p) = \sum_{j=0}^{J-1}\sum_{k=0}^{K-1} A(m,k)\,\Delta V_B(pJ-j-k)$$

k taking on values from 0 to K-1, m being equal to 1, j taking on values from 1 to J, J being equal to or greater than 2, p being an integer;

determining the value of $\Delta V_{Bc}(m,p)$ for each value of p.

2. The method of claim 1 wherein $\Delta V_{Bc}(m,p)$ is transformed from body to navigation frame by the direction cosine matrix $C_B^N$ evaluated at time $[pJ-(J+K-2)/2]\Delta t$, the navigation frame expression of $\Delta V_{Bc}(m,p)$ being $\Delta V_{Nc}(m,p)$.

3. The method of claim 2 wherein the values selected for the set $A(m,k)$ result in the average error in $\Delta V_{Nc}(m,p)/\Delta t$ caused by inphase sculling being approximately proportional to $(\omega \Delta t)^q$ for values of $\omega \Delta t$ in a range of values less than 1, $\omega$ being the angular frequency of the sculling motion, q being equal to or greater than 4.

4. The method of claim 1 wherein m takes on values from 1 to M, the method further comprising the steps:

selecting values for the set $A(m,k)$ for values of m from 2 to M;

selecting values for the set $B(m)$ for all values of m in the equation $$\Delta V_{Bc}(p) = \sum_{m=1}^{M} B(m) \Delta V_{Bc}(m,p)$$

determining the value of $\Delta V_{Bc}(p)$ for each value of p.

5. The method of claim 4 wherein $\Delta V_{Bc}(p)$ is transformed from body to navigation frame by the direction cosine matrix $C_B^N$ evaluated at time $[pJ-(J+K-2)/2]\Delta t$, the navigation frame expression of $\Delta V_{Bc}(p)$ being $\Delta V_{Nc}(p)$.

6. The method of claim 5 wherein the values selected for the set $A(m,k)$ result in the average error in $\Delta V_{Nc}(m,p)/\Delta t$ caused by inphase sculling being approximately proportional to $(\omega \Delta t)^q$ for values of $\omega \Delta t$ in a range of values less than 1, $\omega$ being the angular frequency of the sculling motion, q being equal to or greater than 4.

7. The method of claim 6 wherein the values selected for the set $B(m)$ result in the average error in $\Delta V_{Nc}(p)/\Delta t$ caused by inphase sculling being proportional to $(\omega \Delta t)^q$ for values of $\omega \Delta t$ in a range of values less than 1, $\omega$ being the angular frequency of the sculling motion, q being equal to or greater than 6.

8. The method of claim 4 wherein J=2, K=5, and M=2, the values of $A(m,k)$ being approximately as follows: $A(1,0) = -1/24$, $A(1,1)=0$, $A(1,2)=13/12$, $A(1,3)=0$, $A(1,4)=-1/24$, $A(2,0)=0$, $A(2,1)=-1/6$, $A(2,2)=4/3$, $A(2,3)=-1/6$, and $A(2,4)=0$, $B(1)$ being approximately equal to $-1/5$ and $B(2)$ being approximately equal to $9/5$.

9. The method of claim 4 wherein J=4, K=5, and M=2, the values of $A(m,k)$ being approximately as follows: $A(1,0)= -1/6$, $A(1,1)=0$, $A(1,2)=4/3$, $A(1,3)=0$, $A(1,4)=-1/6$, $A(2,0)=0$, $A(2,1)=-2/3$, $A(2,2)=7/3$, $A(2,3)=-2/3$, and $A(2,4)=0$, $B(1)$ being approximately equal to $-11/5$ and $B(2)$ being approximately equal to $16/5$.

10. The method of claim 1 wherein J=2, K=5, and m=1, the values of $A(1,k)$ being approximately as follows: $A(1,0)=0$, $A(1,1)=-1/6$, $A(1,2)=4/3$, $A(1,3)=-1/6$, and $A(1,4)=0$.

11. The method of claim 1 wherein J=2, K=5, and m=1, the values of $A(1,k)$ being approximately as follows: $A(1,0)=1/30$, $A(1,1)=-3/10$, $A(1,2)=38/15$, $A(1,3)=-3/10$, and $A(1,4)=1/30$.

12. The method of claim 1 wherein J=4, K=3, and m=1, the values of $A(1,k)$ being approximately as follows: $A(1,0)=-2/3$, $A(1,1)=7/3$, and $A(1,2)=-2/3$.

13. The method of claim 1 wherein J=4, K=5, and m=1, the values of $A(1,k)$ being approximately as follows: $A(1,0)=11/30$, $A(1,1)=-32/15$, $A(1,2)=83/15$, $A(1,3)=-32/15$, and $A(1,4)=11/30$.

14. The method of claim 1 wherein J=2, K=5, and m=1, the values of $A(1,k)$ being approximately as follows: $A(1,0)=-1/24$, $A(1,1)=0$, $A(1,2)=13/12$, $A(1,3)=0$, $A(1,4)=-1/24$.

15. The method of claim 1 wherein J=4, K=5, and m=1, the values of $A(1,k)$ being approximately as follows: $A(1,0)=-1/6$, $A(1,1)=0$, $A(1,2)=4/3$, $A(1,3)=0$, and $A(1,4)=-1/6$.

16. The method of claim 1 wherein J=4, K=5, and m=1, the values of $A(1,k)$ being approximately as follows: $A(1,0)=0$, $A(1,1)=-2/3$, $A(1,2)=7/3$, $A(1,3)=-2/3$, and $A(1,4)=0$.

17. The method of claim 1 wherein J=2, K=3, and m=1, the values of $A(1,k)$ being approximately as follows: $A(1,0)=-1/6$, $A(1,1)=4/3$, and $A(1,2)=-1/6$.

18. A digital processor including a memory for use in a strapdown inertial navigation system, the digital processor deriving a sequence of inputs $\Delta V_B(n)$ at times $(n+\frac{1}{2})\Delta t$ from the outputs of one or more accelerometers, n being an integer and $\Delta t$ being a time interval, the digital processor compensating the inputs $\Delta V(n)$ for sculling, the compensated outputs being obtained at times $(pJ+\frac{1}{2})\Delta t$ and being denoted by $\Delta V_{Bc}(m,p)$, the operations of the digital processor being specified by a program stored in memory, the program comprising the following program segments:

a first program segment which causes values for the set $A(m,k)$ to be retrieved from memory, the selected values to be used in the equation $$\Delta V_{Bc}(m,p) = \sum_{j=0}^{J-1} \sum_{k=0}^{K-1} A(m,k) \Delta V_B(pJ - j - k)$$

k taking on values from 0 to K−1, m being equal to 1, j taking on values from 1 to J, J being equal to or greater than 2, p being an integer;

a second program segment which causes the value of $\Delta V_{Bc}(m,p)$ to be calculated for each value of p.

19. The digital processor of claim 18 wherein $\Delta V_{Bc}(p)$ is transformed from body to navigation frame by the direction cosine matrix $C_B^N$ evaluated at time $[pJ-(J+K-2)/2]\Delta t$, the navigation frame expression of $\Delta V_{Bc}(p)$ being $\Delta V_{Nc}(p)$.

20. The digital processor of claim 19 wherein the values selected for the set $A(m,k)$ result in the average error in $\Delta V_{Nc}(m,p)/\Delta t$ caused by inphase sculling being approximately proportional to $(\omega \Delta t)^q$ for values of $\omega \Delta t$ in a range of values less than 1, $\omega$ being the angular frequency of the sculling motion, q being equal to or greater than 4.

21. The digital processor of claim 18 wherein m takes on values from 1 to M, the program further comprising the program segments:

a third program segment which causes values for the set $A(m,k)$ for values of m from 2 to M to be retrieved from memory;

a fourth program segment causing values for the set $B(m)$ for all values of m in the equation $$\Delta V_{Bc}(p) = \sum_{m=1}^{M} B(m) \Delta V_{Bc}(m,p)$$

to be retrieved from memory;

a fifth program segment which causes the value of $\Delta V_{Bc}(p)$ to be calculated for each value of p.

22. The digital processor of claim 21 wherein $\Delta V_{Bc}(p)$ is transformed from body to navigation frame by the direction cosine matrix $C_B^N$ evaluated at time $[pJ-(J+K-2)/2]\Delta t$, the navigation frame expression of $\Delta V_{Bc}(p)$ being $\Delta V_{Nc}(p)$.

23. The digital processor of claim 22 wherein the values selected for the set $A(m,k)$ result in the average error in $\Delta V_{Nc}(m,p)\Delta t$ caused by inphase sculling being approximately proportional to $(\omega \Delta t)^q$ for values of $\omega \Delta t$ in a range of values less than 1, $\omega$ being the angular frequency of the sculling motion, q being equal to or greater than 4.

24. The digital processor of claim 23 wherein the values selected for the set B(m) result in the average error in $\Delta V_{Nc}(p)/\Delta t$ caused by inphase sculling being proportional to $(\omega\Delta t)^q$ for values of $\omega\Delta t$ in a range of values less than 1, $\omega$ being the angular frequency of the sculling motion, q being equal to or greater than 6.

25. The digital processor of claim 21 wherein J=2, K=5, and M=2, the values of A(m,k) being approximately as follows: A(1,0)=$-1/24$, A(1,1)=0, A(1,2)=$13/12$, A(1,3)=0, A(1,4)=$-1/24$, A(2,0)=0, A(2,1)=$-1/6$, A(2,2)=$4/3$, A(2,3)=$-1/6$, and A(2,4)=0, B(1) being approximately equal to $-1/5$ and B(2) being approximately equal to $9/5$.

26. The digital processor of claim 21 wherein J=4, K=5, and M=2, the values of A(m,k) being approximately as follows: A(1,0)=$-1/6$, A(1,1)=0, A(1,2)=$4/3$, A(1,3)=0, A(1,4)=$-1/6$, A(2,0)=0, A(2,1)=$-2/3$, A(2,2)=$7/3$, A(2,3)=$-2/3$, and A(2,4)=0, B(1) being approximately equal to $-11/5$ and B(2) being approximately equal to $16/5$.

27. The digital processor of claim 18 wherein J=2, K=5, and m=1, the values of A(1,k) being approximately as follows: A(1,0)=$-1/24$, A(1,1)=0, A(1,2)=$13/12$, A(1,3)=0, A(1,4)=$-1/24$.

28. The digital processor of claim 18 wherein J=2, K=3, and m=1, the values of A(1,k) being approximately as follows: A(1,0)=$-1/6$, A(1,1)=$4/3$, and A(1,2)=$-1/6$.

29. The digital processor of claim 18 wherein J=2, K=5, and m=1, the values of A(1,k) being approximately as follows: A(1,0)=0, A(1,1)=$-1/6$, A(1,2)=$4/3$, A(1,3)=$-1/6$, and A(1,4)=0.

30. The digital processor of claim 18 wherein J=2, K=5, and m=1, the values of A(1,k) being approximately as follows: A(1,0)=$1/30$, A(1,1)=$-3/10$, A(1,2)=$38/15$, A(1,3)=$-3/10$, and A(1,4)=$1/30$.

31. The digital processor of claim 18 wherein J=4, K=3, and m=1, the values of A(1,k) being approximately as follows: A(1,0)=$-2/3$, A(1,1)=$7/3$, and A(1,2)=$-2/3$.

32. The digital processor of claim 18 wherein J=4, K=5, and m=1, the values of A(1,k) being approximately as follows: A(1,0)=$11/30$, A(1,1)=$-32/15$, A(1,2)=$83/15$, A(1,3)=$-32/15$, and A(1,4)=$11/30$.

33. The digital processor of claim 18 wherein J=4, K=5, and m=1, the values of A(1,k) being approximately as follows: A(1,0)=0, A(1,1)=$-2/3$, A(1,2)=$7/3$, A(1,3)=$-2/3$, and A(1,4)=0.

34. The digital processor of claim 18 wherein J=4, K=5, and m=1, the values of A(1,k) being approximately as follows: A(1,0)=$-1/6$, A(1,1)=0, A(1,2)=$4/3$, A(1,3)=0, and A(1,4)=$-1/6$.

* * * * *

UNITED STATES PATENT AND TRADEMARK OFFICE
CERTIFICATE OF CORRECTION

PATENT NO.   : 5,890,093
DATED        : March 30, 1999
INVENTOR(S)  : Mark et al.

It is certified that error appears in the above-identified patent and that said Letters Patent is hereby corrected as shown below:

<u>Column 2,</u>
Line 35, replace "$n\Delta t$" with -- $(n + 1/2)\Delta t$ --.
Line 46, replace "$pJ\Delta t$" with -- $(pJ + 1/2)\Delta t$ --.

<u>Column 9,</u>
Line 39, replace "$pJ\Delta t$" with -- $(pJ + 1/2)\Delta t$ --.
Line 41, replace "$pJ - (J + K - 1)/2$" with -- $pJ - (J + K - 2)/2$ --.

<u>Column 10,</u>
Line 53, replace "$n\Delta t$" with -- $(n + 1/2)\Delta t$ --.
Line 66, replace "1 to J" with -- 0 to J - 1 --.

<u>Column 12,</u>
Line 14, replace "$\Delta V(n)$" with -- $\Delta V_B(n)$ --.
Line 28, replace "1 to J" with -- 0 to J - 1 --.

Signed and Sealed this

Second Day of November, 2004

JON W. DUDAS
*Director of the United States Patent and Trademark Office*